United States Patent

[11] 3,617,856

[72] Inventor Richard N. Lehnhoff
 Dayton, Ohio 45439
[21] Appl. No. 90,623
[22] Filed Nov. 18, 1970
[45] Patented Nov. 2, 1971
[73] Assignee General Motors Corporation,
 Detroit, Mich.

[54] ALTERNATOR UNDER-FREQUENCY DETECTING CIRCUIT
5 Claims, 1 Drawing Fig.

[52] U.S. Cl. .................................................. 322/24,
 321/18, 322/28, 322/32, 322/59, 323/24, 323/45
[51] Int. Cl. ......................................... H02p 9/26,
 H02p 9/42
[50] Field of Search .......................... 322/24, 28,
 29, 32, 59; 321/18; 323/22 SC, 24, 45

[56] References Cited
UNITED STATES PATENTS

| | | | |
|---|---|---|---|
| 3,113,259 | 12/1963 | Walker .......................... | 323/45 |
| 3,389,326 | 6/1968 | Hyvarinen ..................... | 322/28 |
| 3,521,148 | 7/1970 | Kirk et al. ..................... | 322/28 |

Primary Examiner—Gerald Goldberg
Attorneys—Eugene W. Christen, Creighton R. Meland and Richard G. Stahr ABSTRACT: An alternator under-frequency detecting circuit for reducing the alternator output potential with conditions of less than normal output potential frequency. A source of each an alternating current sensing potential and an alternating current auxiliary sensing potential are connected in series aiding relationship across the alternating current input circuitry of a sensing potential rectifier circuit and a pair of silicon-controlled rectifiers are connected in an opposite polarity relationship across the source of alternating current auxiliary sensing potential. A trigger signal, produced at the beginning of each selected half-cycle of the alternating current auxiliary sensing potential for a predetermined duration of time greater than the normal frequency period of the selected half-cycles is applied across the gate-cathode electrodes of one of the silicon-controlled rectifiers. With normal alternator output potential frequency, the silicon-controlled rectifiers are triggered conductive to effectively shunt the auxiliary sensing potential from the rectifier circuit and the alternator-rectifier system functions normally. With less than normal alternator output potential frequency, the silicon-controlled rectifiers are not triggered conductive, consequently, the sensing and auxiliary sensing potentials are applied across the rectifier circuit in a series aiding relationship, are rectified thereby and sensed by a potential regulator circuit which decreases the alternator field excitation and output potential magnitude.

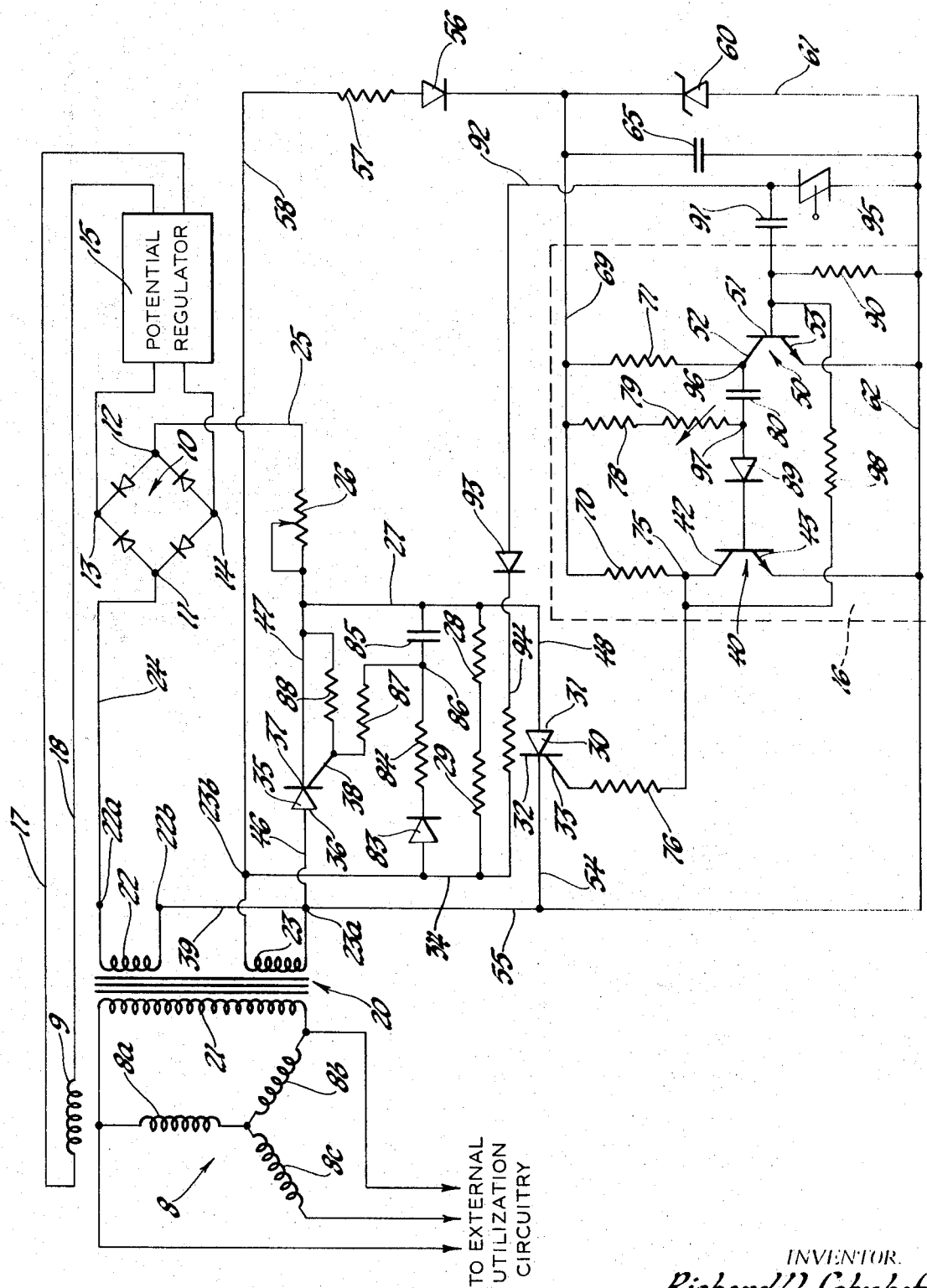

ALTERNATOR UNDER-FREQUENCY DETECTING CIRCUIT

This invention is directed to a circuit for detecting less than normal alternator output potential frequencies and which reduces alternator output potential magnitude with conditions of less than normal output frequency.

With many types of prime movers, the speed of rotation of an alternator rotor may decrease. A decrease of alternator rotor speed reduces the alternator output potential magnitude and frequency. Potential regulator circuits currently employed to regulate alternator output potential magnitude are sensitive to potential magnitude and insensitive to potential frequency. Consequently, upon a reduction of alternator output potential magnitude as a result of a reduction of rotor speed, the potential regulator circuit increases the magnitude of alternator field excitation to maintain the alternator output potential magnitude constant at the preselected value. If this condition is permitted to persist, the alternator field winding may be destroyed. Therefore, a circuit which is frequency sensitive and detects conditions of less than normal alternator output potential frequency to reduce the alternator output potential magnitude by reducing the field excitation with conditions of less than normal output potential frequency is desirable.

It is, therefore, an object of this invention to provide a frequency sensitive circuit for reducing alternator output potential magnitude with conditions of less than normal output potential frequency.

It is another object of this invention to provide an improved alternator underfrequency detecting circuit for reducing the alternator output potential with conditions of less than normal output potential frequency.

In accordance with this invention, an alternator underfrequency detecting circuit for reducing the alternator output potential with conditions of less than normal output potential frequency is provided wherein a source of each an alternating current-sensing potential and an alternating current auxiliary sensing potential are connected in series aiding relationship across the alternating current input circuitry of a sensing potential rectifier circuit and two silicon-controlled rectifiers, which are triggered conductive only with normal alternator output potential frequency, are connected in an opposite polarity relationship across the source of auxiliary sensing potential whereby with conditions of normal alternator output potential frequency, the auxiliary sensing potential is effectively shunted from the sensing potential rectifier circuit by the silicon-controlled rectifiers to provide normal operation of the alternator-regulator system and with conditions of less than normal alternator output potential frequency, the sources of sensing potential and auxiliary sensing potential are applied in series aiding relationship across the sensing potential rectifier circuit to decrease alternator output potential magnitude.

For a better understanding of the present invention, together with additional objects, advantages and features thereof, reference is made to the following description and accompanying single FIGURE drawing which sets forth the alternator underfrequency detecting circuit of this invention in schematic form.

Referring to the FIGURE, the alternator underfrequency detecting circuit of this invention for reducing the alternator output potential with conditions of less than normal output potential frequency is set forth in schematic form in combination with an alternator 8, a sensing potential rectifier circuit, which may be a full-wave bridge type rectifier circuit 10 having alternating current input circuitry, which may be terminals 11 and 12, and direct current output circuitry, which may be terminals 13 and 14, and a potential regulator circuit 15 connected across the rectifier circuit output circuitry and comprises a source of each an alternating current sensing potential, secondary winding 22 of transformer 20, and an alternating current auxiliary sensing potential, secondary winding 23 of transformer 20, each of a frequency the same as the frequency of the output potential of alternator 8, first and second silicon-controlled rectifiers 30 and 35, each having anode, cathode and gate electrodes and circuitry for producing a trigger signal at the beginning of each selected half-cycle of the alternating current auxiliary sensing potential for a predetermined duration of time greater than the normal frequency period of the selected half-cycles, which may be a conventional monostable multivibrator circuit such as that set forth in schematic form within dashed rectangle 16.

As the potential regulator circuit may be any one of the many conventional potential regulator circuits well known in the art and, per se, forms no part of this invention, it has been illustrated in the drawing in block form.

The alternator 8 is illustrated in schematic form and includes three output coils 8a, 8b and 8c and a field coil 9.

Field coil 9 is connected across the output terminals of potential regulator 15 through leads 17 and 18. With this arrangement, the potential regulator 15 is responsive to the alternator output potential magnitude and provides for the proper energization of field coil 9 to maintain a substantially constant predetermined alternator output potential by increasing and decreasing the energization of field coil 9 with decreases and increases, respectively, of the alternator output potential magnitude in a manner well known in the art.

One arrangement for providing a source of each an alternating current sensing potential and an alternating current auxiliary sensing potential, each of a frequency the same as the frequency of the output potential of the alternator, is by transformer coupling two secondary windings to a selected output phase of alternator 8 such as secondary windings 22 and 23 of transformer 20 which are magnetically coupled to primary winding 21 connected across alternator output coils 8a and 8b. It is to be specifically understood that primary winding 21 may be connected across any other two alternator output coils and that a separate primary winding for each of secondary windings 22 and 23 may be employed. For purposes of this description of the novel alternator underfrequency detecting circuit of this invention and without intention or inference of a limitation thereto, it will be assumed that the potential induced in secondary winding 22 is the alternating current sensing potential and the potential induced secondary winding 23 is the alternating current auxiliary sensing potential.

With secondary windings 22 and 23 poled as illustrated in the sole FIGURE, terminal ends 22a and 23a of respective secondary windings 22 and 23 of a positive polarity during the same half-cycles, the source of alternating current sensing potential and the source of alternating current auxiliary sensing potential are connected in series aiding relationship across the sensing potential rectifier circuit 10 alternating current input circuitry. Over those half-cycles of the alternating current sensing and auxiliary sensing potentials during which terminal ends 22a and 23a of respective secondary winding 22 and 23 are of a positive polarity, these respective sources of sensing and auxiliary sensing potential are connected across the sensing potential rectifier circuit 10 alternating current input circuitry through a circuit which may be traced from terminal end 22a of secondary winding 22, through lead 24 to input terminal 11 of sensing potential rectifier circuit 10, from input terminal 12 of sensing potential rectifier circuit 10 through lead 25 to a potential control rheostat 26, through lead 27, an impedance including series resistors 28 and 29, lead 34, through secondary winding 23 in a negative to a positive direction from terminal end 23b to terminal end 23a, lead 39 and through secondary winding 22 in a negative to a positive direction from terminal end 22b to terminal end 22a. During the other half-cycles, this circuit may be traced from positive polarity terminal end 22b of secondary winding 23, through lead 39 and secondary winding 23 in a negative to a positive direction from terminal end 23a to a terminal end 23b, through the impedance, the potential control rheostat of the sensing potential rectifier circuit and through secondary winding 22 in a negative to a positive direction from terminal end 22a to terminal end 22b. Potential control rheostat 26 may be included in this circuit for selecting the desired magnitude of alternator output potential.

The anode-cathode electrodes of silicon-controlled rectifiers 30 and 35 are connected in an opposite polarity relationship across the source of alternating current auxiliary sensing potential. The anode electrode 36 of silicon-controlled rectifier 35 is connected to terminal end 23a of secondary winding 23 through lead 46 and the cathode electrode 37 of silicon-controlled rectifier 35 is connected to terminal end 23b of secondary winding 23 through leads 47 and 27, the impedance comprising series resistors 28 and 29 and lead 34. The anode electrode 31 of silicon-controlled rectifier 30 is connected to output terminal 23b of secondary winding 23 through leads 48 and 27, the impedance comprising resistors 28 and 29 and lead 34 and the cathode electrode 32 of silicon-controlled rectifier 30 is connected to output terminal 23a of secondary winding 23 through leads 54 and 55.

To produce a trigger signal at the beginning of each selected half-cycle of the alternating current auxiliary sensing potential for a predetermined duration of time greater than the normal frequency period of the selected half-cycles, a conventional monostable multivibrator circuit, such as that schematically represented within dashed rectangle 16, may be employed. The operation of this circuit will be described in detail later in this specification.

To supply the direct current operating potential for the monostable multivibrator circuit 16, the alternating current auxiliary sensing potential may be half-wave rectified by a diode 56, the anode electrode of which is connected to terminal end 23b of secondary winding 23 through a current limiting resistor 57 and lead 58 and the cathode electrode of which is connected to terminal end 23a of secondary winding 23 through a zener diode 60 and leads 61, 62 and 55. Zener diode 60 is selected to have an inverse breakdown potential of a magnitude equal to the rated operating potential of the transistors selected as transistors 40 and 50 of the monostable-multivibrator circuit. The half-wave rectified alternating current auxiliary sensing potential is filtered by capacitor 65 and appears as a direct current potential across leads 69 and 62 of a positive and a negative polarity, respectively. As the respective collector electrodes 42 and 52 of type NPN-transistors 40 and 50 of monostable multivibrator circuit 16 are connected to the positive polarity lead 69 through respective collector resistors 70 and 71 and the respective emitter electrodes 43 and 53 are connected to the negative polarity lead 62, these type NPN transistors are poled for forward conduction through the collector-emitter electrodes thereof.

As is well known in the art, the monostable multivibrator circuit may be switched from the normal, stable state to an alternate state and spontaneously returns to the stable state at the conclusion of a predetermined time interval.

In the stable state of multivibrator circuit 16, transistor 40 conducts through the collector-emitter electrodes and transistor 50 is not conducting. Upon monostable multivibrator circuit 16 being triggered to the alternate state in a manner to be explained in detail later in this specification, transistor 50 conducts through the collector-emitter electrodes and transistor 40 is not conducting. While monostable multivibrator 16 is in the alternate state, capacitor 80 charges through resistor 78, variable resistor 79 and the collector-emitter electrodes of transistor 50. When capacitor 80 has become charged, the potential upon junction 97 becomes positive and is of the proper polarity to produce base-emitter current flow through type NPN-transistor 40. The resulting flow of collector-emitter current flow through transistor 40 triggers this device conductive through the collector-emitter electrodes. Upon the conduction of transistor 40 through the collector-emitter electrodes, the base electrode 51 of transistor 50 is connected to negative polarity lead 62 through resistor 98, a condition which extinguishes transistor 50 and returns monostable multivibrator circuit 16 to the stable state. Diode 89 may be included in the base-emitter circuit of transistor 40 to improve the temperature stability of monostable multivibrator circuit 16.

While multivibrator circuit 16 is in the alternate state, with transistor 40 not conducting, the potential of junction 75 is of a positive polarity with respect to lead 62. This potential, which is the trigger signal produced by monostable multivibrator circuit 16, is applied across the gate-cathode electrodes of the one silicon-controlled rectifier which is reverse poled by the auxiliary sensing potential during the selected half-cycles. For purposes of this specification, and without intention or inference of a limitation thereto, it will be assumed that the selected half cycles of the alternating current auxiliary sensing potential are those half-cycles during which terminal ends 23a and 23b of secondary winding 23 are of a positive and a negative polarity, respectively. The trigger signal produced by monostable multivibrator circuit 16 while in the alternate state, therefore, is applied across the gate electrode 33 and the cathode electrode 32 of silicon controlled rectifier 30 through current limiting resistor 76.

The duration of time which monostable multivibrator circuit 16 is in the alternate state is determined by the time constant of the circuit including resistor 78, variable resistor 79 and capacitor 80. Consequently, the duration of time that monostable multivibrator circuit 16 remains in the alternate state may be precisely selected by adjusting variable resistor 79. For purposes of this specification and without intention or inference of a limitation thereto, it will be assumed that the normal output potential frequency of alternator 8 is 60 cycles per second. For reasons which will become apparent later in this specification, monostable multivibrator circuit 16 must produce a trigger signal for a predetermined duration of time greater than the normal frequency period of the selected half-cycles. Therefore, monostable multivibrator circuit 16 must remain in the alternate state for a duration of time greater than the period of a half-cycle of a 60 cycle potential dependent upon the minimum output potential frequency at which the novel frequency detecting circuit of this invention is desired to become operative. For example, if it is desired that the circuit of this invention become operative when the frequency of alternator 8 output potential has decreased below 55 cycles per second, potentiometer 79 is adjusted to maintain monostable multivibrator circuit 16 in the alternate state for a period of 9.09 milliseconds, the period of one-half cycle of a 55 cycle potential. It will be assumed for purposes of this specification that variable resistor 79 is adjusted to provide for monostable multivibrator circuit 16 to remain in the alternate state for a duration of time of 9.09 milliseconds.

Provision is made for applying the auxiliary sensing potential across the gate-cathode electrodes of the other silicon-controlled rectifier 35 during each other half-cycle of the auxiliary sensing potential while silicon-controlled rectifier 30 is conducting and for triggering the other silicon-controlled rectifier 35 conductive during each selected half-cycle of the auxiliary sensing potential only after silicon-controlled rectifier 30 has conducted during the preceding other half-cycle. The series combination of a diode 83, a resistor 84 and a capacitor 85 is connected across secondary winding 23 through a circuit which may be traced from terminal end 23b thereof through lead 34 through the series combination of diode 83, resistor 84 and capacitor 85, leads 27 and 48, the anode-cathode electrodes of silicon-controlled rectifier 30 and leads 54 and 55 to terminal end 23a of secondary winding 23. The gate electrode 38 of silicon-controlled rectifier 35 is connected to junction 86 between diode 83 and capacitor 85 through a current limiting resistor 87. Resistor 88 may be connected across the gate-cathode electrodes of silicon-controlled rectifier 35 to provide noise immunity. The operation of this circuitry will be explained in detail later in this specification.

Upon startup, over the first half-cycle of auxiliary sensing potential during which terminal end 23b of secondary winding 23 is of a positive polarity with respect to terminal end 23a, the auxiliary sensing potential is rectified by diode 56 and appears as a positive and negative polarity direct current operating potential across respective leads 69 and 62. Consequently, monostable multivibrator 16 settles into its stable state with transistor 40 conducting and transistor 50 not conducting.

At the beginning of the next half-cycle, a selected half-cycle, of the alternating current auxiliary supply potential, during which terminal end 23a of secondary winding 23 is of a positive polarity with respect to terminal end 23b, the monostable multivibrator circuit 16 is in the stable state, consequently, the trigger signal produced thereby is not present upon junction 75 and capacitor 91 charges through a circuit which may be traced from terminal end 23a of secondary winding 23, through leads 55 and 62, resistor 90, capacitor 91, lead 92, diode 93, and lead 94, impedance 29 and lead 34 to terminal end 23b of secondary winding 23. When the potential across resistor 90 and capacitor 91 has reached a magnitude which exceeds the breakdown potential of a potential sensitive switch 95, which may be any one of the many potential sensitive bilateral or unilateral potential sensitive electrical switches commercially available from the General Electric Company and Motorola Semiconductor Products, Inc., this device conducts to provide a discharge path for capacitor 91 through the base electrode 51 and the emitter electrode 53 of type NPN-transistor 50 in the proper polarity relationship to produce base-emitter current flow through a type NPN transistor. The resulting flow of base-emitter current flow through transistor 50 triggers this device conductive through the collector-emitter electrodes thereof to place junction 96 at a negative polarity potential, a condition which extinguishes conducting transistor 40 to place monostable multivibrator circuit 16 in the alternate state. Resistor 90 is of a low ohmic value, consequently, capacitor 91 charges rapidly to trigger monostable multivibrator circuit 16 to the alternate state substantially at the beginning of each selected half-cycle of the auxiliary sensing potential. The trigger signal produced by monostable multivibrator 16 at this time is ineffective as silicon-controlled rectifier 30 is reverse biased by the auxiliary alternating current sensing potential.

Assuming a normal alternator 8 output potential frequency, at the beginning of the next half-cycle of the alternating current auxiliary sensing potential during which terminal end 23b of secondary winding 23 is of a positive polarity with respect to terminal end 23a, the trigger signal produced by monostable multivibrator 16 is still present as the period of a half-cycle of a 60 cycle potential is 8.33 milliseconds. As silicon-controlled rectifier 30 is forward poled during these other half-cycles by the auxiliary alternating current sensing potential, which is of a magnitude greater than the alternating current sensing potential of secondary winding 22, silicon-controlled rectifier 30 is triggered conductive through the anode-cathode electrodes. While silicon-controlled rectifier 30 is conducting, capacitor 85 charges through diode 83 and resistor 84. When capacitor 85 has become charged, the auxiliary sensing potential is applied across the gate-cathode electrodes of the other silicon-controlled rectifier 35 in the proper polarity relationship to produce gate current through this device through a circuit which may be traced from terminal end 23b of secondary winding 23, through diode 83, current limiting resistors 84 and 87, the gate-cathode electrodes of silicon-controlled rectifier 35, leads 47, 27 and 48, the anode-cathode electrodes of silicon-controlled rectifier 30 and leads 54 and 55 to terminal end 23a of secondary winding 23. As conducting silicon-controlled rectifier 30 effectively removes the auxiliary sensing potential from across silicon-controlled rectifier 35, this device is forward poled by the sensing potential of secondary winding 22, consequently the gate current produced by the auxiliary sensing potential triggers this device conductive to conduct sensing current through a circuit which may be traced from terminal end 22b of secondary winding 22, through leads 39 and 46, the anode-cathode electrodes of silicon-controlled rectifier 35, lead 47, potentiometer 26, lead 25, through sensing potential bridge rectifier circuit 10 and lead 24 to terminal end 22a of secondary winding 22.

At the beginning of the next half-cycle, a selected half-cycle, of the alternating current auxiliary sensing potential, during which terminal end 23a of secondary winding 23 is of a positive polarity with respect to terminal end 23b, monostable multivibrator circuit 16 is in the stable state, consequently, silicon-controlled rectifier 30 does not immediately conduct. However, charged capacitor 85 discharges through the gate-cathode electrodes of silicon-controlled rectifier 35 in the proper polarity relationship to produce gate current through this device. As silicon-controlled rectifier 35 is now forward poled by the alternating current auxiliary sensing potential, which is of a magnitude greater than the alternating current sensing potential, silicon-controlled rectifier 35 conducts the current produced by the auxiliary sensing potential through resistors 28 and 29. Concurrently, capacitor 91 becomes charged through a circuit previously described until potential sensitive switch 95 is triggered conductive to discharge capacitor 91 through the base-emitter electrodes of transistor 50 to trigger the monostable multivibrator circuit 16 to the alternate state. As conducting silicon-controlled rectifier 35 effectively removes the alternating current auxiliary sensing potential from across silicon-controlled rectifier 30, the trigger signal produced by monostable multivibrator circuit 16 triggers this device conductive to conduct sensing current through a circuit which may be traced from terminal end 22a of secondary winding 22, through lead 24, through bridge circuit 10, lead 25, potentiometer 26, leads 27 and 48, the anode-cathode electrodes of silicon-controlled rectifier 30 and leads 54, 55 and 39 to terminal end 22b of secondary winding 22.

This action continues so long as the frequency of the output potential of alternator 8 remains normal.

With underfrequency conditions, the monostable multivibrator circuit 16 returns to its stable state before the selected half-cycle of the alternating current auxiliary sensing potential is complete. Consequently, the trigger signal for silicon-controlled rectifier 30 is not present at the beginning of the next half-cycle to trigger silicon-controlled rectifier 30 conductive. As silicon-controlled rectifier does not conduct, capacitor 85 does not charge and the auxiliary sensing potential is not applied across the gate-cathode electrode of silicon-controlled rectifier 35. Consequently, neither silicon-controlled rectifier 30 nor silicon-controlled rectifier 35 conducts. With neither silicon-controlled rectifier conducting, the alternating current sensing potential and the alternating current auxiliary sensing potential is connected in series aiding relationship across the bridge circuit 10 through the circuit previously described. As these potentials are in series aiding relationship, the sensing potential to which regulator 15 is responsive is increased in magnitude. In response to this increase of sensing potential magnitude, potential regulator circuit 15 reduces the energization of alternator field 9 to reduce the alternator 8 output potential. So long as the frequency of the output potential of alternator 8 is less than normal, neither silicon controlled rectifier 30 nor 35 will conduct and potential regulator 15 will operate to maintain the output potential of alternator 8 at a reduced magnitude.

From this description of the circuit of this invention, it is apparent that the auxiliary sensing potential is applied across the gate-cathode electrodes of silicon-controlled rectifier 35 during each half-cycle thereof other than the selected half-cycles while silicon-controlled rectifier 30 is conducting to complete the circuit previously described and capacitor 85 triggers silicon-controlled rectifier 35 conductive during each selected half-cycle of the auxiliary sensing potential only after silicon-controlled rectifier 30 has conducted during the preceding cycle to complete the circuit, previously described, through which capacitor 85 is charged.

While specific electrical components and polarities have been set forth in this specification, it will be obvious to those skilled in the art that other electrical components having similar electrical characteristics and compatible electrical polarities may be substituted therefor without departing from the spirit of the invention.

While a preferred embodiment of the present invention has been shown and described, it will be obvious to those skilled in the art that various modifications and substitutions may be

What is claimed is:

1. An alternator underfrequency detecting circuit for reducing the alternator output potential with conditions of less than normal output potential frequency comprising in combination with an alternator, a sensing potential rectifier circuit having alternating current input circuitry and direct current output circuitry and a potential regulator circuit connected across the rectifier circuit output circuitry, a source of each an alternating current sensing potential and an alternating current auxiliary sensing potential, each of a frequency the same as the frequency of the output potential of said alternator, means for connecting said source of alternating current sensing potential and said source of alternating current auxiliary sensing potential in series aiding relationship across said sensing potential rectifier circuit alternating current input circuitry, first and second silicon-controlled rectifiers each having anode, cathode and gate electrodes, means for connecting said anode-cathode electrodes of said silicon-controlled rectifiers in an opposite polarity relationship across said source of alternating current auxiliary sensing potential, means for producing a trigger signal at the beginning of each selected half-cycle of said alternating current auxiliary sensing potential for a predetermined duration of time greater than the normal frequency period of said selected half-cycles, means for applying said trigger signal across said gate-cathode electrodes of the one said silicon-controlled rectifier which is reverse poled by said auxiliary sensing potential during said selected half-cycles thereof, means for applying said auxiliary sensing potential across said gate cathode electrodes of the other said silicon-controlled rectifier during each other half-cycle of said auxiliary sensing potential while said the one said silicon-controlled rectifier is conducting, and means for triggering said other said silicon-controlled rectifier conductive during each selected half-cycle of said auxiliary sensing potential only after said the one said silicon-controlled rectifier has conducted during the preceding other said half-cycle.

2. An alternator underfrequency detecting circuit for reducing the alternator output potential with conditions of less than normal output potential frequency comprising in combination with an alternator, a sensing potential rectifier circuit having alternating current input circuitry and direct current output circuitry and a potential regulator circuit connected across the rectifier output circuitry, a source of each an alternating current sensing potential and an alternating current auxiliary sensing potential, each of a frequency the same as the frequency of the output potential of said alternator, an impedance, means including said impedance for connecting said source of alternating current sensing potential and said source of alternating current auxiliary sensing potential in series aiding relationship across said sensing potential rectifier circuit alternating current input circuitry, first and second silicon-controlled rectifiers each having anode, cathode and gate electrodes, means for connecting said anode-cathode electrodes of said silicon-controlled rectifiers in an opposite polarity relationship across said source of alternating current auxiliary sensing potential, means for producing a trigger signal at the beginning of each selected half-cycle of said alternating current auxiliary sensing potential for a predetermined duration of time greater than the normal frequency period of said selected half-cycles, means for applying said trigger signal across said gate-cathode electrodes of the one said silicon-controlled rectifier which is reverse poled by said auxiliary sensing potential during said selected half-cycles thereof, means for applying said auxiliary sensing potential across said gate-cathode electrodes of the other said silicon-controlled rectifier during each other half-cycle of said auxiliary sensing potential while the one said silicon-controlled rectifier is conducting, and means for triggering said other said silicon-controlled rectifier conductive during each selected half-cycle of said auxiliary sensing potential only after said the one said silicon-controlled rectifier has conducted during the preceding other said half-cycle.

3. An alternator underfrequency detecting circuit for reducing the alternator output potential with conditions of less than normal output potential frequency comprising in combination with an alternator, a sensing potential rectifier circuit having alternating current input circuitry and direct current output circuitry and a potential regulator circuit connected across the rectifier output circuitry, a source of each an alternating current sensing potential and an alternating current auxiliary sensing potential, each of a frequency the same as the frequency of the output potential of said alternator, an impedance, means including said impedance for connecting said source of alternating current sensing potential and said source of alternating current auxiliary sensing potential in series aiding relationship across said sensing potential rectifier circuit alternating current input circuitry, first and second silicon-controlled rectifiers each having anode, cathode and gate electrodes, means for connecting said anode-cathode electrodes of said silicon-controlled rectifiers in an opposite polarity relationship across said source of alternating current auxiliary sensing potential, a monostable multivibrator circuit responsive to selected half-cycles of said auxiliary sensing potential, for producing a trigger signal at the beginning of each said selected half-cycle thereof for a predetermined duration of time greater than the normal frequency period of said selected half-cycles, means for applying said trigger signal across said gate-cathode electrodes of the one said silicon-controlled rectifier which is reverse poled by said auxiliary sensing potential during said selected half-cycles thereof, means for applying said auxiliary sensing potential across said gate-cathode electrodes of the other said silicon-controlled rectifier during each other half-cycle of said auxiliary sensing potential while said the one said silicon-controlled rectifier is conducting, and means for triggering said other said silicon-controlled rectifier conductive during each selected half-cycle of said auxiliary sensing potential only after said the one said silicon-controlled rectifier has conducted during the preceding other said half-cycle.

4. An alternator underfrequency detecting circuit for reducing the alternator output potential with conditions of less than normal output potential frequency comprising in combination with an alternator, a sensing potential rectifier circuit having alternating current input circuitry and direct current output circuitry and a potential regulator circuit connected across said rectifier output circuitry, a source of each an alternating current sensing potential and an alternating current auxiliary sensing potential, each of a frequency the same as the frequency of the output potential of said alternator, an impedance, means including said impedance for connecting said source of alternating current sensing potential and said source of alternating current auxiliary sensing potential in series aiding relationship across said sensing potential rectifier circuit alternating current input circuitry, first and second silicon-controlled rectifiers each having anode, cathode and gate electrodes, means for connecting said anode-cathode electrodes of said silicon-controlled rectifiers in an opposite polarity relationship across said source of alternating current auxiliary sensing potential, a monostable multivibrator circuit responsive to selected half-cycles of said auxiliary sensing potential for producing a trigger signal at the beginning of each said selected half-cycle thereof for a predetermined duration of time greater than the normal frequency period of said selected half-cycles, means for applying said trigger signal across said gate-cathode electrodes of the one said silicon-controlled rectifier which is reverse poled by said auxiliary sensing potential during said selected half-cycles thereof, a diode, a capacitor, means for connecting said diode and said capacitor in series across said source of alternating current auxiliary sensing potential, and means for connecting said gate electrode of the other said silicon-controlled rectifier to the junction between said diode and said capacitor.

5. An alternator underfrequency detecting circuit for reducing the alternator output potential with conditions of less than normal output potential frequency comprising in combination with an alternator, a sensing potential rectifier circuit having alternating current input circuitry and direct current output circuitry and a potential regulator circuit connected across said rectifier output circuitry, a source of each an alternating current sensing potential and an alternating current auxiliary sensing potential, each of a frequency the same as the frequency of the output potential of said alternator, an impedance, means including said impedance for connecting said source of alternating current sensing potential and said source of alternating current auxiliary sensing potential in series aiding relationship across said sensing potential rectifier circuit alternating current input circuitry, first and second silicon-controlled rectifiers each having anode, cathode and gate electrodes, means for connecting said anode-cathode electrodes of said silicon-controlled rectifiers in an opposite polarity relationship across said source of alternating current auxiliary sensing potential, a monostable multivibrator circuit responsive to selected half-cycles of said auxiliary sensing potential for producing a trigger signal at the beginning of each said selected half-cycle thereof for a predetermined duration of time greater than the normal frequency period of said selected half-cycles, means for applying said trigger signal across said gate-cathode electrodes of the one said silicon-controlled rectifier which is reverse poled by said auxiliary sensing potential during said selected half-cycles thereof, a diode, a resistor, a capacitor, means for connecting said diode, said resistor and said capacitor in series across said source of alternating current auxiliary sensing potential in that order, and means for connecting said gate electrode of the other said silicon-controlled rectifier to the junction between said resistor and said capacitor.

* * * * *